Aug. 6, 1940.   R. W. STAYTON   2,210,346
SPRAYING ATTACHMENT FOR TRACTORS
Filed Oct. 9, 1939   3 Sheets-Sheet 3
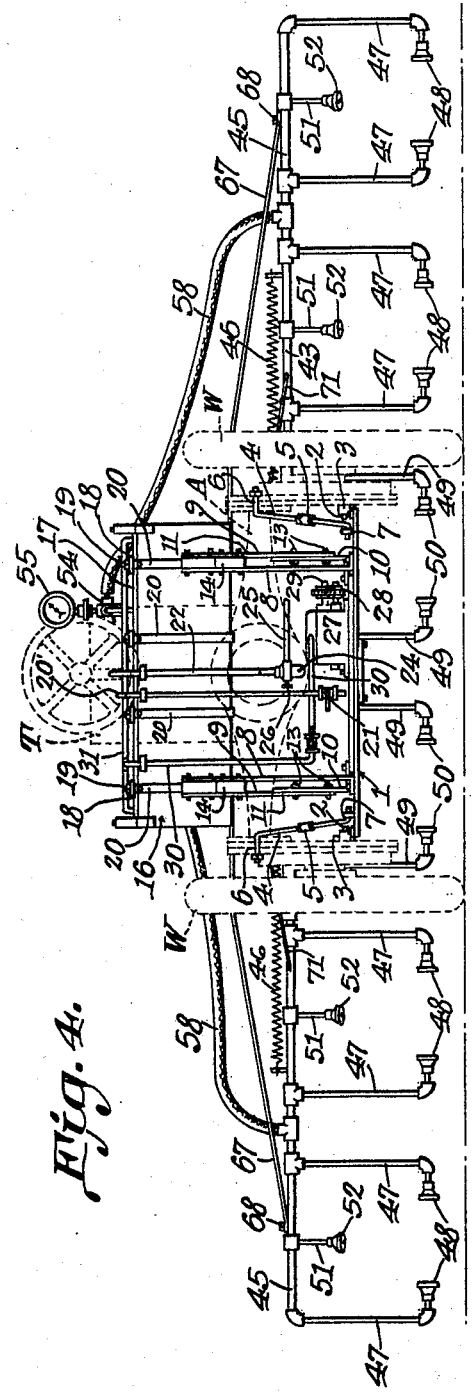
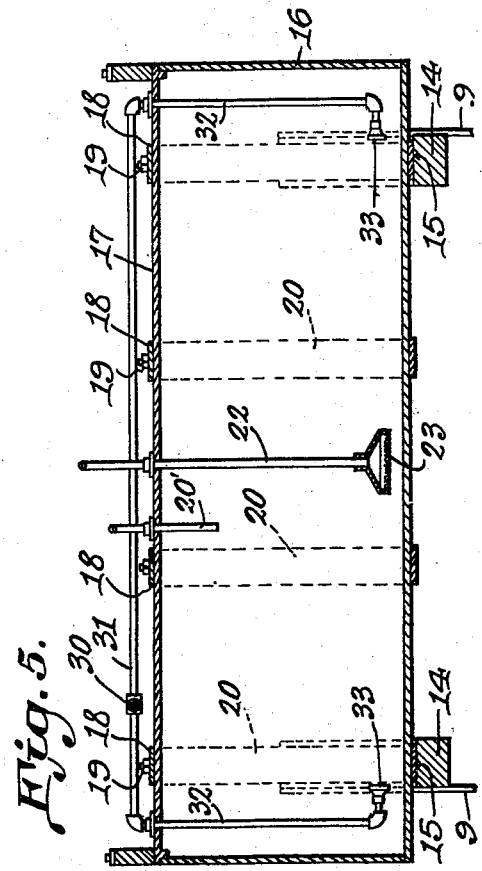
R. W. Stayton INVENTOR.
BY
ATTORNEYS.

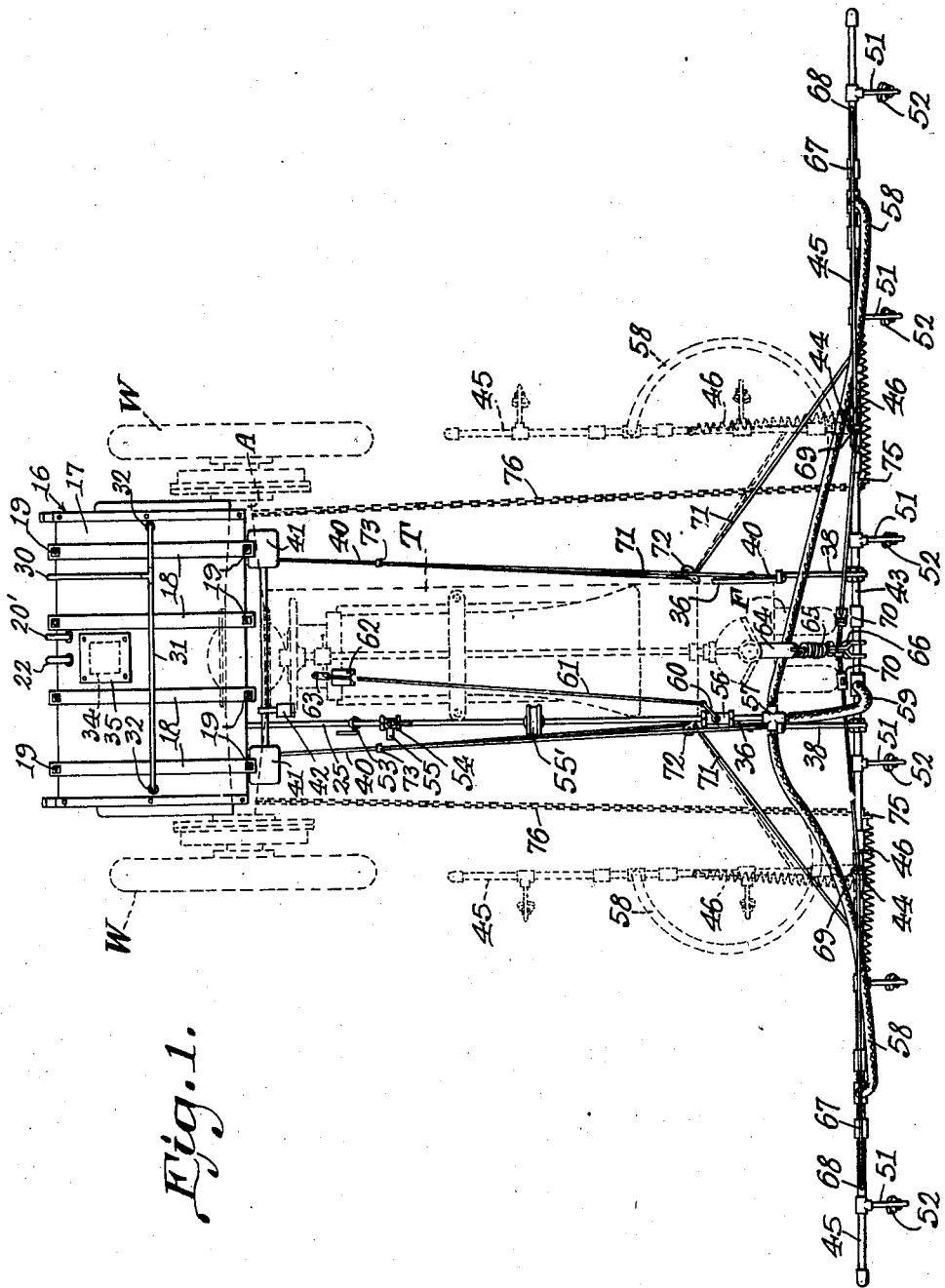

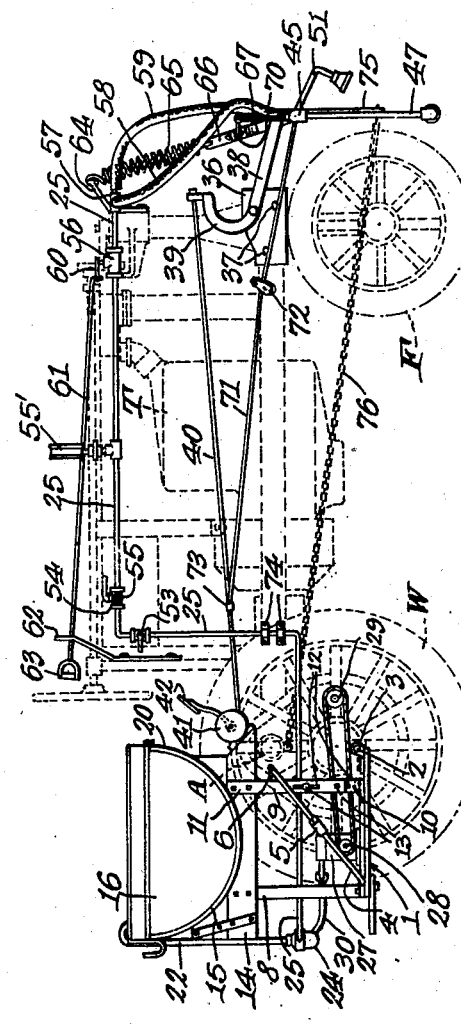

Patented Aug. 6, 1940

2,210,346

UNITED STATES PATENT OFFICE 2,210,346

SPRAYING ATTACHMENT FOR TRACTORS

Ruel W. Stayton, Glenwood Springs, Colo.

Application October 9, 1939, Serial No. 298,658

6 Claims. (Cl. 299—30)

This invention relates to apparatus designed to be mounted on tractors already in use and to be sold as complete units.

An object of the invention is to provide a spraying attachment which, while in use, can be utilized for simultaneously spraying both sides of several rows of vegetation, portions of the attachment being extended laterally well beyond the sides of the tractor to which it is attached but being so mounted as to be swung inwardly toward the sides of the tractor when necessary to permit the tractor and the attachment thereon to travel through an entrance to a field or to make a short turn at a corner or close to the fence at the edge of the field under treatment.

Another object is to provide an attachment of this character having the spraying nozzles, which are located in pairs, so supported as to permit convenient up and down adjustment thereof to adapt them to the plants to be sprayed.

A still further object is to combine with the spraying element a tank or container for holding the spray, this being in communication with the spraying heads or nozzles through valved means under constant control of the driver whereby agitation of the contents of the container as well as flow of spraying fluid to the nozzles may be regulated at will.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a top plan view of the attachment, the tractor to which it is applied being indicated by broken lines and the positions of the side members of the attachment when folded inwardly being also indicated by broken lines.

Figure 2 is a side elevation of the attachment, the tractor being shown by broken lines.

Figure 3 is a front elevation of the attachment, the tractor in rear thereof being indicated by broken lines.

Figure 4 is a rear elevation of the attachment showing those portions thereof visible when the attachment is in position on a tractor, the tractor being illustrated by broken lines.

Figure 5 is an enlarged vertical transverse section through the spray tank.

In the drawings a tractor has been indicated by broken lines at T and the tractor illustrated is of the well known "Farmall" type. It is to be understood, however, that the attachment can be modified and adjusted to permit it to be used on tractors of other types than the one shown.

The tractor has a U-shaped plate or yoke 1 located between the rear wheels W of the tractor below the axle A and this plate is pivotally supported at its front corners by studs 2 or the like projecting into brackets 3 carried by the plate. The rear corner portions of plate or yoke 1 are supported by braces 4 each of which preferably includes a turnbuckle 5 to permit adjustment and the upper end of each brace is extended laterally within and detachably secured to a portion of the tractor frame as shown at 6 while pivotal connections are provided at 7 between the lower or rear end portions of the braces and the adjacent corner portions of plate or yoke 1.

Thus the plate is held rigidly within the rear portion of the tractor but is capable of limited angular adjustment about its front connections 2—3.

Front and rear standards 9 and 8 respectively are secured to the front and back portions of plate or platform 1 and, if desired, some of the standards can be adjustable in length. For example each standard 9 can be made of two lapping sections 10 and 11 slotted as at 12 to receive clamping bolts 13. Standards 8 and 9 are fixedly joined to and support parallel sills 14 formed preferably of hard wood and provided with concave seats 15 on which is mounted the concave bottom of a substantially semi-cylindrical tank 16. The front ends of the sills 14 are proportioned to rest upon the axle A so that the tank is thus located where a considerable portion of its weight is transmitted directly to the axle.

Tank 16 has a cover 17 held in place by crossstraps 18 the projecting ends of which are bolted or otherwise secured, as at 19, to bands 20 embracing and fitted snugly against the outer surface of the tank.

Projecting through the lid or top 17 of the tank and terminating slightly therebelow is an overflow pipe 20' which extends outside of and below the tank, there being a valve 21 for normally closing this pipe to prevent the escape of air or fluid under pressure through the pipe. An outflow pipe 22 is suspended within the tank, preferably adjacent to the center thereof and has its intake or lower end provided with a screen 23 whereby the suction of impurities into the pipe is prevented. This outflow pipe 22 leads to a sediment well 24 from which extends a distributing pipe 25, the flow of fluid to the pipe 25 being controlled by a valve 26. A pump 27 of any suitable construction is fixedly mounted on the plate or platform 1 and, in the structure illustrated, is provided with chain and sprocket mechanism 28 whereby the pump can be driven from the usual power take-off 29 of the tractor. A pipe 30 extends from the outlet of pump 27 to a header 31 supported above tank 16 and the ends of the header are downturned into the end portions of the tank as indicated at 32, the lower ends of these downwardly extended portions being provided with outlet nozzles 33 arranged to extend toward each other close to the bottom so that when air is foced by the pump into pipe 30 and header 31, it will be delivered into the contents of the tank adjacent to the bottom of the tank thereby keeping the contents thoroughly agitated while at the same time subjecting them to pressure from the air, so that the liquid content can thus flow upwardly through pipe 22 for use as hereinafter explained.

The lid or top 17 of the tank is formed with an opening 34 through which the tank can be filled but this opening is normally closed by a removable plate 35 so that there will be no leakage of air or liquid under pressure through the opening while the apparatus is in use.

The structure thus far described is located at the rear of the tractor between the wheels W and obviously can be readily placed in position. The spraying portion of the apparatus is located at the front end of the tractor. To the sides of the front end of the tractor frame are fastened plates 36, these being secured by means of bolts 37 or the like. To each plate there is attached a lever 38 extending forwardly beyond the plate while one arm of the lever is curved upwardly and forwardly as shown at 39. One of these levers is located at each side of the tractor and the arm 39 of each lever has an operating cable 40 secured thereto and extending rearwardly therefrom to a hydraulic pump or lift of any suitable construction which has been indicated generally at 41 and which is adapted to be actuated by pressure on a foot lever 42 when exerted by the foot of the operator.

Thus when the lever 42 is depressed, the pump or lift will be actuated to simultaneously pull on the two cables 40 so as to swing the forward ends of levers 38 upwardly. When pressure is relieved, however, lever 38 will drop by gravity and the parts restored to their initial positions.

The forward ends of the levers 38 engage and support a header 43 which extends transversely across the front end of the tractor in front of the front wheel or wheels F. This header 43, which constitutes the intermediate header of the sprayer terminates directly in front of the rear wheels W. These ends are closed and are hingedly connected at 44 to side headers 45 likewise closed at their ends and which are adapted to swing forwardly into alinement with the intermediate header 43 at which time these side headers will be extended considerable distances beyond the sides of the tractor as shown particularly in Figures 1 and 3. Springs 46 are located in front of the respective hinges 44 and are constantly under tension, each spring being connected to the intermediate header and to one of the end or side headers. Thus the springs serve to hold the headers normally alined as shown by full lines in the drawings. However should the end or side headers be swung backwardly about their hinged connections 44, the springs 46 would be placed under increased tension as will be obvious by referring to the dotted line positions of these side or end headers 45 in Figure 1.

In the structure illustrated two pairs of depending pipes are carried by each of the side headers, as shown at 47, there being spraying heads or nozzles 48 at the lower ends of the nozzles of each pair which are positioned to deliver a spraying mixture onto opposite sides of a row of vegetation extending between the spraying heads. Two pairs of depending pipes 49 are also extended from the intermediate header and these are likewise provided with spraying heads 50 similar to the heads 48, the heads of each pair being positioned to deliver sprays toward each other.

Extending forwardly and downwardly from each of the headers 43 and 45 are pipes 51 having spray heads or nozzles 52 so located as to direct a spray downwardly onto a row of vegetation while the sides of the row are being sprayed.

The distributing pipe 25 heretofore referred to is extended to a cut-off valve 53 located where it can be conveniently actuated by the driver of the tractor and from this valve the pipe extends to a three-way valve 54 likewise positioned where it can be controlled readily by the driver. This three-way valve has a side outlet extension 55 to which fluid can be directed to a hose or the like not shown connected to a sprayer to be used in spraying trees or the like. Normally, however, valve 54 is so located that fluid under pressure will flow through the valve and within pipe 25 past a pressure gauge 55' to a regulating valve 56 and thence to a distributing head 57. To this head are connected flexible pipes 58 extending to the respective side headers 45 while another flexible pipe 59 is extended from head 57 to the intermediate header 43.

An arm 60 is extended from the stem of valve 56 and has an actuating rod 61 pivotally connected thereto and slidable within a supporting bracket 62. This rod has a handle 63 or the like by means of which the driver can readily move rod 61 forwardly or backwardly for the purpose of shifting valve 56 so as to regulate the flow of spraying fluid to the distributing head 57.

A bracket 64 is attached to the front end of the tractor adjacent to the top thereof and is connected by a coiled spring 65 to a strap 66 connected to the middle portion of the intermediate header 43. The spraying head formed by the headers 43 and 45 and the parts associated therewith is braced against sagging by means of truss rods 67 secured at their outer ends to the outer end portions of the headers 45 as shown at 68 and inclined upwardly to and past supports 69 which can constitute continuations of the pintles of the hinges 44. From these supports the truss rods are extended toward each other and adjustably joined, as at 70, to the strap 66.

Connected to each of the headers 45 near its hinged end, is a supplemental cable 71. One of these cables is of course located at each side of the tractor and each cable is extended backwardly and inwardly away from its header 45 and in engagement with a guide sheave 72 attached to the adjacent side of the tractor. From this sheave the supplemental cable is extended backwardly and attached to the cable 40 as shown at 73.

It will be obvious that, for the purpose of connecting this attachment to a tractor such as shown, it is merely necessary to bolt bracket 64 to the front end of the tractor, to bolt plates 36 to the sides of the tractor at its front end, to suitably connect the guide sheave 72 to said tractor at the sides, to attach the brackets 3 to the tractor, and to couple the upper ends of the braces 4 to said tractor. Pipe 25 can of course be attached to the tractor as indicated at 74, if so desired.

With the parts located as shown and described the spring 65 will support most of the weight of the spraying head formed by headers 43 and 45 and the parts thereon so that very little power will be required to elevate this spraying head. To prevent the spraying head from rotating and thereby swinging the spraying heads out of proper position, a tongue 75 can be fixedly secured to and extended downwardly from the intermediate header 43 adjacent to each end thereof and each of these tongues can be anchored to the rear portion of the tractor by means of chains 76 or the like.

In practice the tank 16 is provided with a supply of spraying fluid after which the opening 34 is closed. Operation of the power take-off 29 will cause the pump 27 to be actuated so that air under pressure will be forced into the tank and will not only serve to agitate the contents of the tank but will also be utilized to place the contents under pressure. Until valve 21 is closed, however, this pressure will not be built up because pipe 20' will serve as an air vent. By opening valves 26 and 53 and closing valve 21, fluid under pressure will be delivered into pipe 22 and thence to pipe 25 through which it will flow either to the side extension 55 or past the gage 55' to valve 56. By means of rod 61 valve 56 can be actuated to allow the fluid under pressure to flow to the distributing head 57 and thence through the flexible pipes 58 and 59 to the headers 45 and 43 so that the fluid thus will be delivered in the form of a spray onto the vegetation located between heads 48 and between heads 50. This fluid will also be sprayed downwardly onto the vegetation from the heads 52. This spraying operation takes place as the tractor moves forwardly along the rows and obviously several rows can be sprayed simultaneously.

When it is desired to move through a narrow space or to make a quick turn close to a fence or in a corner, the operator actuates foot lever 42 so as to pull through cables 40 upon the arms 39 of levers 38. Thus levers 38 will lift the headers and at the same time these cables 40 will pull through the supplemental cables 37 upon the side headers 45. Because these cables 71 are connected to the side headers close to their hinges, a slight movement of the supplemental cables is all that is necessary to cause the side headers 45 to swing backwardly and inwardly substantially to the positions indicated by broken lines in Figure 1 where they will be located directly in front of the rear wheels W. Following this lifting and folding operation the tractor can make a turn and thereafter, by releasing cables 40, the spraying head will return to its normal position under the action of springs 46 and the weight of the spraying head.

Obviously the gage 55' can be both a pressure indicating gage and a safety valve so that should pressure be built up in pipe 25 while valve 56 is closed, there would be no danger of injury to the apparatus.

It will be noted that all of the apparatus can be controlled readily by the driver of the tractor.

Obviously by removing the pipes 47 and 49 from the header the apparatus is converted into an overhead sprayer for general field work where top coverage only is required.

What is claimed is:

1. A spraying attachment for tractors including an intermediate header, side headers hingedly connected thereto, spraying nozzles connected to all of the headers and disposed in pairs, yielding means for holding the headers normally alined, an actuating lever, and means operated by said lever when moved in one direction for simultaneously elevating the headers and swinging the side headers backwardly and inwardly toward each other and relative to the intermediate header.

2. In spraying apparatus an intermediate header, yielding means for supporting the intermediate header from the front of a tractor, side headers hingedly connected to the intermediate header, yielding means for holding all of the headers normally alined, spraying elements connected to all of the headers, levers connected at one end to the intermediate header, means for connecting the levers to a tractor for pivotal support thereby, a lever, and means operated by the lever for simultaneously actuating the header-engaging levers to raise the headers and for swinging the side headers toward each other relative to the intermediate header and against the action of said yielding means.

3. A spraying attachment for tractors including a tank for holding a liquid spray, means for mounting the same on one end of a tractor, an intermediate header, side headers hingedly connected thereto, yielding means for holding all of the headers normally alined, a yielding support positioned to connect the intermediate header to the front end of a tractor, pipe connections between the tank and the respective headers, said connections including flexible portions, levers for connection to the sides of a tractor, said levers being connected to the intermediate header, and means under the control of an operator for simultaneously actuating said levers to lift the headers and for swinging the side headers relative to the intermediate header and into substantially parallel relation.

4. A spraying attachment for tractors including a platform, means for connecting the platform to one end of a tractor, a tank supported above the platform and connected thereto, a pump connected to the tank for supplying air thereto under pressure, means for operatively connecting the pump to the power take-off of a tractor, an intermediate header, side headers hingedly connected thereto, yielding means for holding all of the headers normally alined, spraying elements carried by the respective headers, means for yieldingly supporting the intermediate header from the other end of the tractor, levers connected to the intermediate header and positioned for pivotal mounting on the tractor, and means under the control of a single operating element for simultaneously shifting said levers to raise the headers and for swinging the side headers relative to the intermediate header and into positions substantially parallel with each other.

5. The combination with a tractor, of a spraying attachment including a tank, means for connecting the tank to the tractor between the wheels at one end of the tractor, an intermediate header yieldingly connected to the front end of the tractor and extending transversely thereof, side headers hingedly connected to the intermediate header, yielding means for holding the headers normally alined with the side headers projecting well beyond the sides of the tractor, levers fulcrumed on the tractor and connected at one end to the intermediate header, and means under the control of an operator for simultaneously actuating the levers to lift the header and for swinging the side headers backwardly and inwardly against the action of said yielding means and into substantially parallel positions in front of said wheels of the tractor.

6. The combination with a tractor, of a spraying attachment thereon including an intermediate header, levers fulcrumed on the tractor and connected to the header, side headers hingedly connected to the intermediate header, yielding means connecting the headers for holding them normally alined with the side headers extended well beyond the sides of the tractor, a pulling element connected to each lever, a supplemental pulling element connecting each of the first named pulling elements to one of the side headers, means engaged by the supplemental pulling element for guiding said elements toward the sides of the tractor and holding them normally along diverging lines extending to the side headers, and means for simultaneously actuating all of the pulling elements to operate the levers and elements thereby to raise the headers simultaneously and to simultaneously swing the side headers against said yielding means rearwardly and laterally toward the sides of the tractor and into position in the paths of the wheels at the back end of the tractor.

RUEL W. STAYTON.